US008588708B2

(12) United States Patent
Minemura et al.

(10) Patent No.: US 8,588,708 B2
(45) Date of Patent: Nov. 19, 2013

(54) COMMUNICATION DEVICE AND DETECTION PERIOD CORRECTION METHOD

(75) Inventors: Takashi Minemura, Tokyo (JP); Kengo Kurose, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 570 days.

(21) Appl. No.: 12/877,178

(22) Filed: Sep. 8, 2010

(65) Prior Publication Data

US 2011/0300811 A1 Dec. 8, 2011

(30) Foreign Application Priority Data

Jun. 3, 2010 (JP) ................. P2010-128247

(51) Int. Cl.
*H04B 1/40* (2006.01)

(52) U.S. Cl.
USPC ............. 455/75; 455/502; 455/525; 455/522; 370/350; 370/311; 370/338

(58) Field of Classification Search
USPC .......................................................... 455/75
See application file for complete search history.

(56) References Cited

U.S. PATENT DOCUMENTS

| 5,552,749 | A  | * | 9/1996 | Nowatski et al. ............... 331/14 |
| 5,940,744 | A  | * | 8/1999 | Uda ................................ 455/75 |
| 6,549,545 | B1 | * | 4/2003 | Yamamoto et al. ............ 370/508 |
| 6,757,323 | B1 | * | 6/2004 | Fleming et al. ................ 375/142 |
| 7,995,547 | B1 | * | 8/2011 | Barratt .......................... 370/338 |
| 2007/0155341 | A1 | * | 7/2007 | Haiut ................................ 455/75 |
| 2007/0159994 | A1 | * | 7/2007 | Brown et al. .................. 370/324 |
| 2007/0207750 | A1 | * | 9/2007 | Brown et al. ............... 455/127.5 |
| 2008/0130519 | A1 | * | 6/2008 | Bahl et al. ...................... 370/254 |
| 2009/0088194 | A1 | * | 4/2009 | Petty et al. ..................... 455/502 |
| 2010/0062739 | A1 | * | 3/2010 | Hozumi et al. ............. 455/343.1 |
| 2010/0157972 | A1 | * | 6/2010 | Junell ............................. 370/350 |
| 2011/0211511 | A1 | * | 9/2011 | Bakthavathsalu et al. .... 370/311 |
| 2011/0222516 | A1 | * | 9/2011 | Kurose et al. ................. 370/338 |
| 2011/0273276 | A1 | * | 11/2011 | Minemura et al. ........... 340/10.1 |
| 2012/0115540 | A1 | * | 5/2012 | Kurose et al. ................. 455/525 |
| 2012/0202552 | A1 | * | 8/2012 | Minemura et al. ............ 455/522 |

FOREIGN PATENT DOCUMENTS

JP 2009-089434 A 4/2009

* cited by examiner

*Primary Examiner* — Fayyaz Alam
*Assistant Examiner* — David Bilodeau
(74) *Attorney, Agent, or Firm* — Holtz, Holtz, Goodman & Chick, PC

(57) ABSTRACT

According to an embodiment, a communication device of the embodiment includes: a reference frequency generating unit configured to generate a reference frequency having a deviation from center frequency deviation under a predetermined condition, a radio signal detection unit configured to operate in a detection period based on the reference frequency and detect a periodic radio signal generated based on a reference frequency having higher precision than the precision of the reference frequency. The radio signal detection unit corrects the detection period by using the periodic signal.

7 Claims, 15 Drawing Sheets

COMMUNICATION DEVICE AND DETECTION PERIOD CORRECTION METHOD

CROSS-REFERENCE TO RELATED APPLICATION

This application is based upon and claims the benefit of priority from Japanese Patent Application No. 2010-128247, filed Jun. 3, 2010; the entire contents of which are incorporated herein by reference.

FIELD

An embodiment of the present invention relates to a communication device and a detection period correction method.

BACKGROUND

Recently, there is known a chip for minimizing standby power consumption. When such a chip for minimizing standby power consumption (hereinafter referred to as "Eco-Chip") is mounted on a communication device such as a cell phone, the communication device can always monitor an access point (hereinafter referred to simply as an "AP") and a radio signal transmitted from other communication device. More specifically, for example, when an EcoChip is used to perform wireless LAN communication between a cell phone and an AP, the power of the WLAN communication module with large power consumption in the cell phone is turned off and the EcoChip with small power consumption can be used to monitor a signal from the AP on a regular basis.

Here, the EcoChip in the cell phone determines whether a standby signal transmitted from an AP or the like is detected or not, only by a receiving intensity (high or low) on a time axis. For this reason, the EcoChip determines the presence or absence of a required detection based on a unique transmission sequence or the periodicity of the signal continued to be transmitted at a constant period.

The EcoChip may use a reference frequency generated by a crystal oscillator in the circuit as an operating clock for operating the EcoChip. Alternatively, an atomic clock can be considered to be used as an operating clock for operating the EcoChip. However, the atomic clock depends on the radio wave receiving circumstance, and thus it is difficult to use the atomic clock in a room or particularly underground.

Here, the precision of the crystal oscillator depends on the temperature (frequency-temperature characteristics). An oscillation frequency of the crystal oscillator may be cause increase and decrease of several 100 ppm depending on the ambient temperature. For this reason, if a crystal oscillator is to be used as the operating clock for operating the EcoChip, the oscillation frequency of the crystal oscillator needs to be corrected on a regular basis or on an event-driven basis.

Although it may be considered that a more high-precision crystal oscillator is installed in the circuit as the operating clock for operating the EcoChip, reserving a new space for the high-precision crystal oscillator is required. Moreover, a method of correcting the oscillation frequency by a feedback circuit or the like increases the power consumption of the EcoChip. Thus, it is difficult to achieve low power consumption by the EcoChip.

DETAILED DESCRIPTION

An embodiment of a present invention has been made in consideration of the circumstances mentioned above and an object thereof is to provide a communication device and a detection period correction method which maintains low power consumption in a circuit and corrects a reference frequency with high precision.

To achieve the above object, a communication device of the embodiment includes: a reference frequency generating unit configured to generate a reference frequency having a deviation from center frequency deviation under a predetermined condition, a radio signal detection unit configured to operate in a detection period based on the reference frequency and detect a periodic radio signal generated based on a reference frequency having higher precision than the precision of the reference frequency. The radio signal detection unit corrects the detection period by using the periodic signal.

Hereinafter, an embodiment of a communication device and a detection period correction method according to the present invention will be described based on the accompanying drawings.

Figure 1:
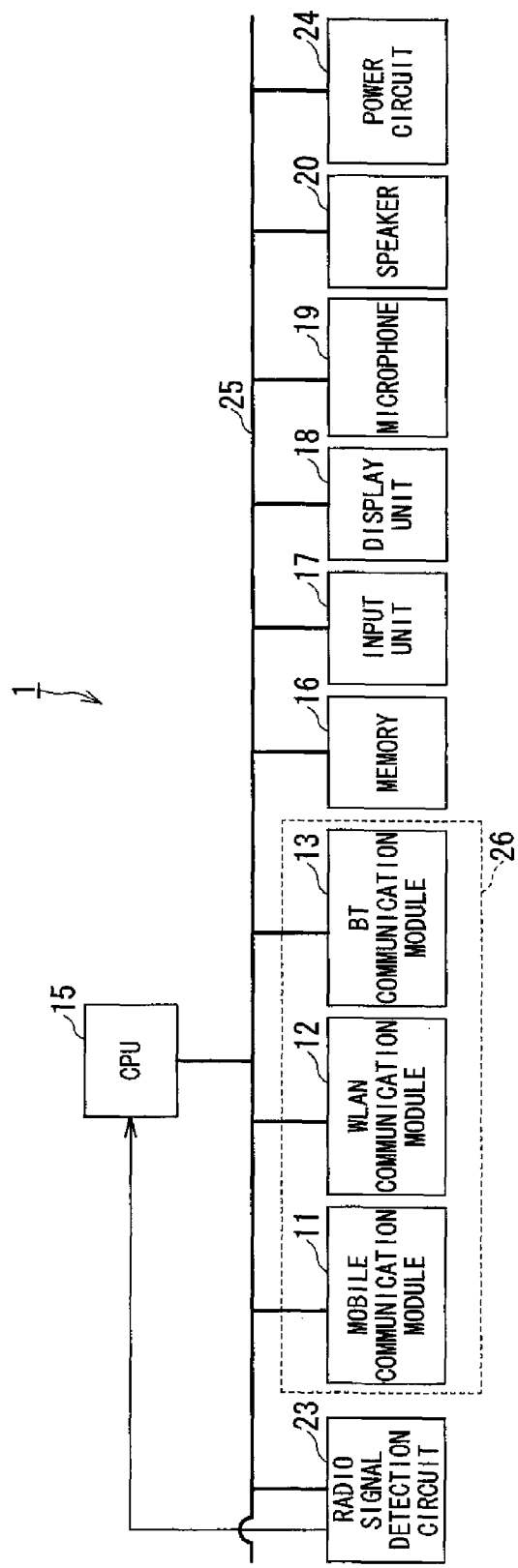
FIG. 1 is a system block diagram of a cell phone as an example of the communication device according to the present embodiment.

FIG. 1 is a system block diagram of a cell phone 1 as an example of the communication device according to the present embodiment.

The cell phone 1 comprises a mobile communication module 11, a wireless LAN (WLAN) communication module 12, a Bluetooth (BT) communication module 13, a CPU 15, a memory 16, an input unit 17, a display unit 18, a microphone 19, a speaker 20 a radio signal detection circuit 23, and a power circuit 24. The components of the cell phone 1 are connected through a bus 25.

The power circuit 24 generates power-supply voltage based on an output of a battery and supplies power for each circuit of the cell phone 1. The cell phone 1 operates by the power supplied from the power circuit 24.

The mobile communication module 11 transmits and receives of sound and data to and from the base station. The mobile communication module 11 comprises an antenna and receives radio signals through the space transmitted by a predetermined communication processing system from the base station in the mobile communication network. The mobile communication module 11 also emits a predetermined radio signals to the space through the antenna toward the base station to allow wireless communication by a predetermined communication processing system. The mobile communication module 11 performs predetermined processing to the received signals and then outputs data to the CPU 15 or outputs sound from the speaker 20. The mobile communication module 11 also executes predetermined processing to data outputted by the CPU 15 and sound collected by the microphone 19 and then transmits them.

The wireless LAN (WLAN) communication module 12 performs wireless LAN communication compliant with a predetermined standard, such as IEEE 802.11a/b/g, through an antenna.

The Bluetooth (BT) communication module 13 wirelessly communicates with other communication devices existing in proximity (e.g., several to ten-odd meters) to the cell phone 1 through an antenna.

The cell phone 1 may comprise the WLAN communication module 12 or the BT communication module 13.

The CPU (Central Processing Unit) 15 generates and supplies various control signals to control the components of the cell phone 1. The CPU 15 executes various processes according to programs stored in a ROM (Read Only Memory) or various application programs or control programs including an operating system (OS) loaded from the ROM to a RAM (Random Access Memory).

The memory 16 is a storage device such as a ROM, a RAM, a flash memory device, and an HDD (Hard Disc Drive).

The input unit 17 receives input through, for example, an operation key-type input unit or a touch panel-type input unit and transfers an input signal to the CPU 15. The display unit 18 displays data including characters or images under the control of the CPU 15. The display unit 18 is constituted by, for example, an LCD (Liquid Crystal Display), an organic EL (ElectroLuminescence) display, and an inorganic EL display.

The radio signal detection circuit 23 is a circuit for detecting an amplitude-modulated (on-off keying) radio signals. The radio signal detection circuit 23 determines the type of the radio signals based on a signal pattern of the radio signals received from other communication devices, such as an access point (hereinafter referred to as "AP") and a personal computer (PC). The signal pattern is judged based on a period between successive signals and a level of each signal detected along the time axis. Hereinafter, the signal pattern will be called a "specific pattern".

The radio signal detection circuit 23 outputs a signal as a predetermined interruption signal to the CPU 15, the WLAN communication module 12, the BT communication module 13, and/or the power circuit 24 if the specific pattern corresponds with a specific pattern of a waiting radio signal stored in advance.

The WLAN communication module 12 and the BT communication module 13 have functions of obtaining data by down-converting and decoding the received radio signals and functions of transmitting data (encoding, modulating, and radio signal transmission). Therefore, the operating power of the WLAN and BT communication module are higher than that in the radio signal detection circuit 23. More specifically, the radio signal detection circuit 23 is capable of waiting for the predetermined radio signals by lower operating power than the operating power when the WLAN communication module 12 and the BT communication module 13 monitor the predetermined radio signals sent out from an AP or a PC. Therefore, instead of the WLAN communication module 12 and the BT communication module 13, the radio signal detection circuit 23 of the cell phone 1 in the present embodiment waits for the radio signal to reduce the operating power consumption of the whole system of the cell phone 1 WLAN communication module 12, etc.

Incidentally, when the radio signal detection circuit 23 detects a predetermined radio signal and outputs the interruption signal, each unit which receives the signal (e.g., the WLAN communication module 12) is activated to perform a well-known connection process or data communication.

The circuits of the radio signal detection circuit 23 are constituted by applying conventional techniques capable of achieving power saving described in documents shown in the descriptions of each of the circuits. Additionally, the radio signal detection circuit 23 can have not only the configurations described in the documents described below, but can have any configurations as long as the radio signal can be at least monitored by lower operating power than the operating power when the WLAN communication module 12 and the BT communication module 13 monitor the radio signal sent out by other devices (a PC, an AP, etc).

Incidentally, if a WLAN communication module 12, a BT communication module 13, and a mobile communication module 11 performing wireless communication to an external device of a cell phone 1 are not particularly distinguished, or at least any one of the three modules is indicated, the one is simply referred to as a "wireless communication module 26".

Figure 2:
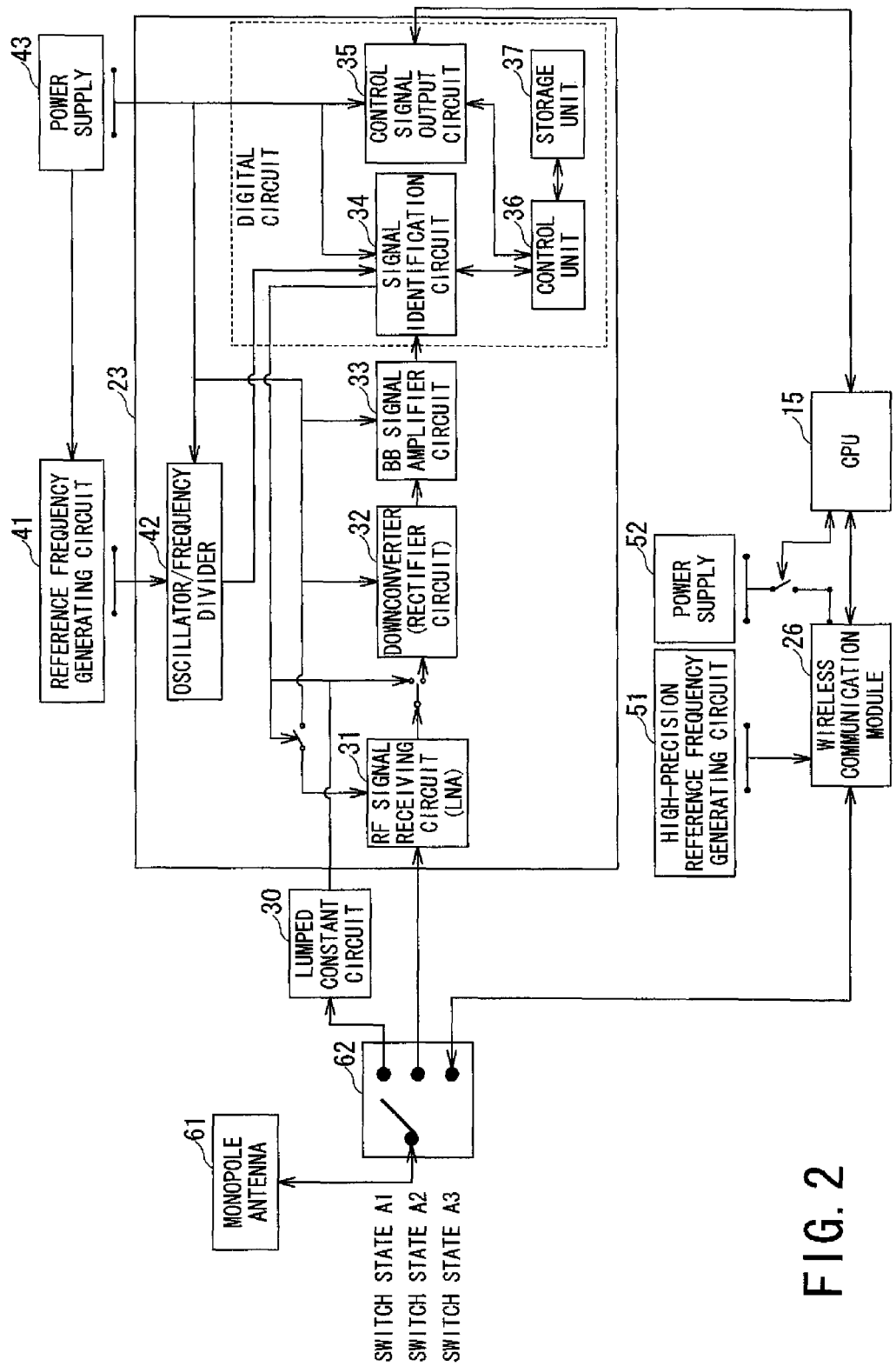
FIG. 2 is a circuit configuration diagram particularly illustrating a radio signal detection circuit and the wireless communication module of FIG. 1.

FIG. 2 is a circuit configuration diagram particularly illustrating the radio signal detection circuit 23 and the wireless communication module 26 of FIG. 1.

The radio signal detection circuit 23 comprises an RF signal receiving circuit 31, a down converter (rectifier circuit) 32, a baseband (BB) signal amplifier circuit 33, a signal identification circuit 34, and a control signal output circuit 35. Among the components, the RF signal receiving circuit 31, the down converter 32, and the BB signal amplifier circuit 33 are constituted by analog circuits. The signal identification circuit 34 and the control signal output circuit 35 are constituted by digital circuits.

When a radio signal (electric wave) reaching detection sensitivity transmitted from a communication device such as an AP and a PC is received, an RF (Radio Frequency) signal receiving circuit 31 amplifies this signal and outputs the signal to a downconverter 32. Incidentally, the RF signal receiving circuit 31 is a bypassable circuit. When the RF signal receiving circuit 31 is bypassed, a signal received by a monopole antenna 61 is outputted to the downconverter 32 through a lumped constant circuit 30.

The downconverter (rectifier circuit) 32 acquires a demodulated signal by rectifying and wave-detecting an RF signal outputted from the RF signal receiving circuit 31. Incidentally, for the purpose of power saving, the downconverter (rectifier circuit) 32 is configured not to have a local oscillator. For example, a technique disclosed in JP4377946B (demodulating device) can be applied to the configuration of the downconverter (rectifier circuit) 32.

The BB signal amplifier circuit 33 amplifies the demodulated signal outputted from the downconverter (rectifier circuit) 32. For example, a technique disclosed in JP2009-89434A (trigger signal generating device) can be applied to the configuration of the BB signal amplifier circuit 33.

The signal identification circuit 34 compares the potential of the signal amplified by the BB signal amplifier circuit 33 with a reference potential. Although a plurality of values can be set for the reference potential, it is preferable to set a lower threshold to allow detection of all signals including low level ones. The signal identification circuit 34 determines that a detected signal is at a high level if the signal has a potential equal to or higher than the reference potential. The signal identification circuit 34 determines that a detected signal is at a low level if the signal has a potential lower than the reference potential. The signal identification circuit 34 acquires a specific pattern based on these levels and a period of successive signals along the time axis.

In addition, the signal identification circuit 34 identifies whether the acquired specific pattern matches the specific pattern of an expected radio signal or not, and outputs the identified result to the control unit 36.

The control signal output circuit 35 generates a control signal indicating an interrupt occurrence based on an instruction outputted from the control unit 36 and outputs the generated control signal to the CPU 15 and the like. In addition, the control signal output circuit 35 receives a control signal outputted from the CPU 15 and notifies the control unit 36 of the receipt of the signal.

The control unit 36 controls the signal identification circuit 34 and the control signal output circuit 35. Moreover, according to the present embodiment, the control unit 36 autonomously performs a detection window correction process (described later) in the radio signal detection circuit 23.

A storage unit 37 stores information on a specific pattern of a signal which the radio signal detection circuit 23 waits for instead of the WLAN communication module 12 and the BT communication module 13. In addition, the storage unit 37 stores data required for the detection window correction process (described later) and correction data generated for the correction process.

A reference frequency generating circuit 41 generates a reference frequency for operation of the radio signal detection circuit 23, and supplies the reference frequency to the oscillator/frequency divider 42. The oscillator/frequency divider 42 divides the supplied reference frequency into a required frequency and supplies the frequency to the signal identification circuit 34. Incidentally, each circuit of the radio signal detection circuit 23, the reference frequency generating circuit 41, and the oscillator/frequency divider 42 operate on the operating voltage supplied from a power supply 43.

The wireless communication module 26 (the WLAN communication module 12, the BT communication module 13, and the mobile communication module 11) is configured to operate based on a reference frequency supplied from the high-precision reference frequency generating circuit 51. In addition, the wireless communication module 26 operates based on an operating power supplied from a power supply 52.

Figure 3:
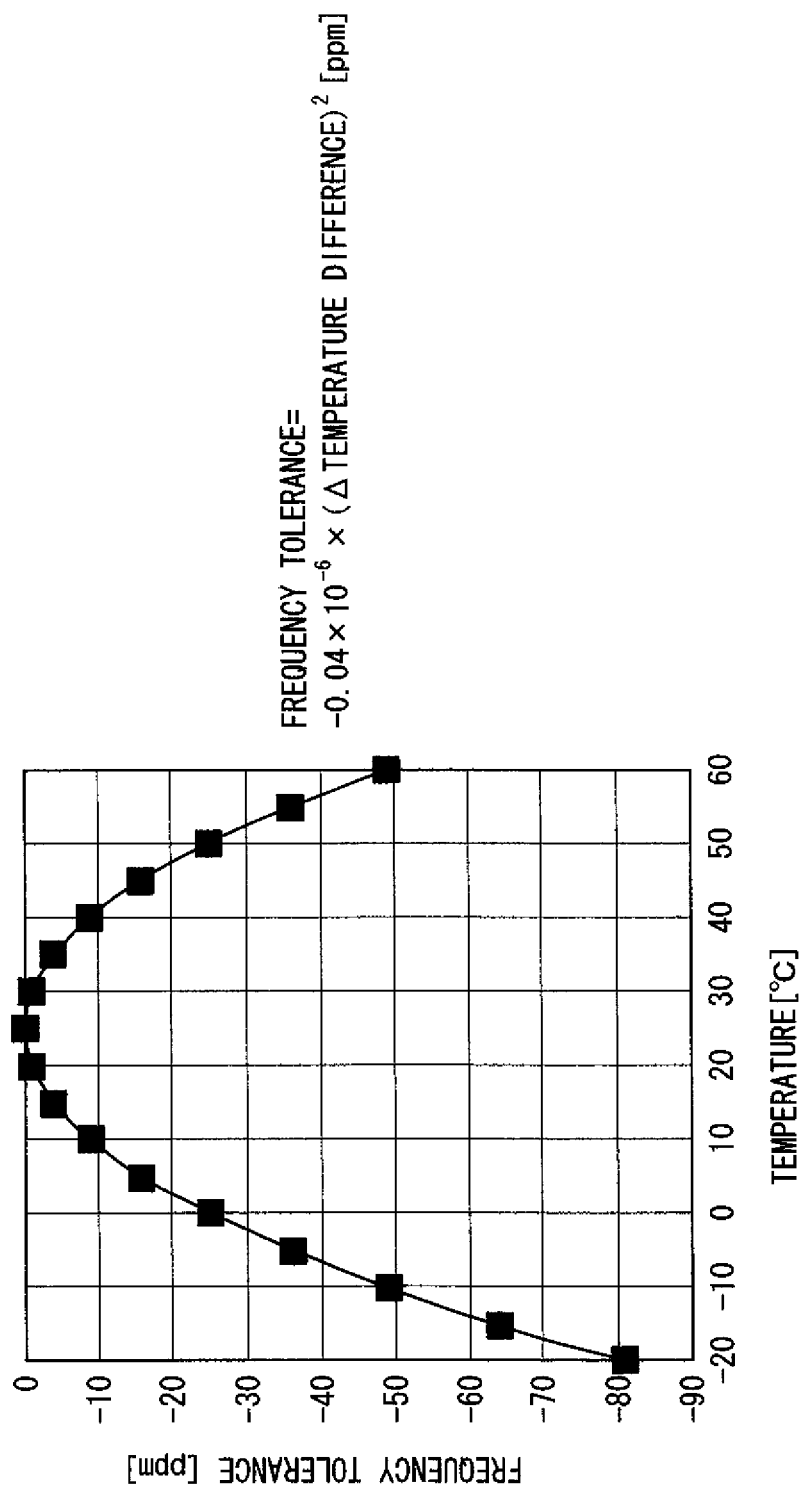
FIG. 3 illustrates an example of frequency tolerance over temperature of the reference frequency generating circuit.

FIG. 3 illustrates an example of frequency tolerance over temperature of the reference frequency generating circuit.

FIG. 3 illustrates the change of the frequency tolerance with a change in ambient temperature on the basis of the frequency at 25° C. As illustrated in FIG. 3, a general reference frequency generating circuit changes in crystal oscillation precision with a change in temperature. Therefore, the crystal oscillator requires temperature compensation.

Here, the high-precision reference frequency generating circuit 51 which supplies a reference frequency for the wireless communication module 26 generates a reference frequency by a crystal oscillator operating, for example, at 1 MHz. The high-precision reference frequency generating circuit 51 includes a correction circuit such as a temperature compensation circuit, and thus has good frequency-temperature characteristics depending on temperature, but has large power consumption.

In contrast to this, the reference frequency generating circuit 41 which supplies a reference frequency for the radio signal detection circuit 23 is a circuit which generates a reference frequency by a crystal oscillator operating, for example, at 32.768 kHz. From the point of view of power saving, the reference frequency generating circuit 41 generates a smaller frequency than the high-precision reference frequency generating circuit 51, and does not have such a high-precision correction circuit as the high-precision reference frequency generating circuit 51 has. More specifically, the reference frequency generating circuit 41 operates on low power than the high-precision reference frequency generating circuit 51. However, the reference frequency generating circuit 41 has lower precision and may contain errors because of varying the frequency with a change in ambient temperature.

A monopole antenna 61 functions as a receiving antenna of the radio signal detection circuit 23 or a transmitting/receiving antenna of the wireless communication module 26 depending on the state of the antenna switch 62. When the state of the antenna switch 62 is switch states A1 and A2, the monopole antenna 61 functions as a receiving antenna of the radio signal detection circuit 23. When the state of the antenna switch 62 is switch state A1, the RF signal receiving circuit 31 is bypassed, and the received signal is supplied to the downconverter 32 through the lumped constant circuit 30. When the state of the antenna switch 62 is switch state A2, the received signal is supplied to the RF signal receiving circuit 31. When the state of the antenna switch 62 is switch state A3, the monopole antenna 61 functions as a transmitting/receiving antenna of the wireless communication module 26.

Incidentally, the wireless communication module 26, switched transmitting/receiving state is switched depending on the state of the antenna switch 62, may comprise at least one of the WLAN communication module 12, the BT communication module 13, and the mobile communication module 11.

According to the present embodiment, the radio signal detection circuit 23 detects a periodic radio signal transmitted from other devices in a constant (hereinafter referred to as "periodic signal") by acquiring a signal pattern expressed by a signal level in each detection window. Each detection window has a period corresponding to the period of the radio signal. More specifically, the radio signal detection circuit 23 can detect a periodic signal by identifying whether a substantially similar signal pattern appears in each detection window or not. The radio signal detection circuit 23 stores a signal pattern of a detected periodic signal for each detection window in a register.

Figure 4:
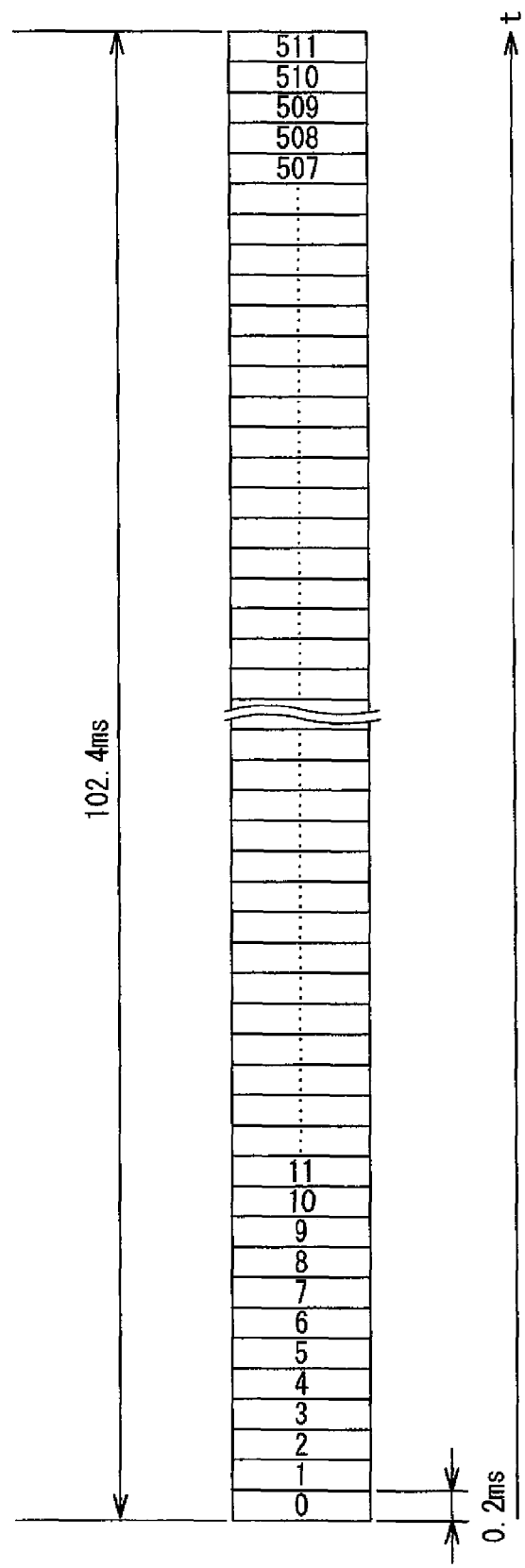
FIG. 4 describes a register configuration which a radio signal detection circuit uses to detect a radio signal.

FIG. 4 describes a register configuration which the radio signal detection circuit 23 uses to detect a radio signal.

The radio signal detection circuit 23 outputs the signal level identified by the signal identification circuit 34 for each predetermined sampling to the control unit 36. In a case where the radio signal detection circuit 23 detects a radio signal transmitted in a period of 102.4 ms, such as a beacon signal used at wireless LAN communication, the radio signal detection circuit 23 may set one sampling pitch to 0.2 ms and the number of sampling points to 512 for detecting the beacon signal. In a case where the radio signal detection circuit 23 detects a radio signal transmitted in other period, the radio signal detection circuit 23 can adjust the sampling pitch and the number of sampling points.

The control unit 36 sequentially stores the identified signal levels in 512 registers (storage unit 37) numbered from 0 to 511. The control unit 36 stores information indicating high level (1) when the signal identification circuit 34 detects a signal having higher potential than the reference potential, or when a signal is detected. The control unit 36 stores information indicating low level (0) when the signal identification circuit 34 detects a signal having lower potential than the reference potential, or when a signal is undetected. When the signal levels are stored in the registers numbered from 0 to 511, the register stores the signal level in register numbered 0 again. If a periodic signal is ideally detected, the information indicating high level is always found in a specific position of the register. Therefore, the control unit 36 can detects the periodic signal by referring to a high-level position in the detection window.

Figure 5A:
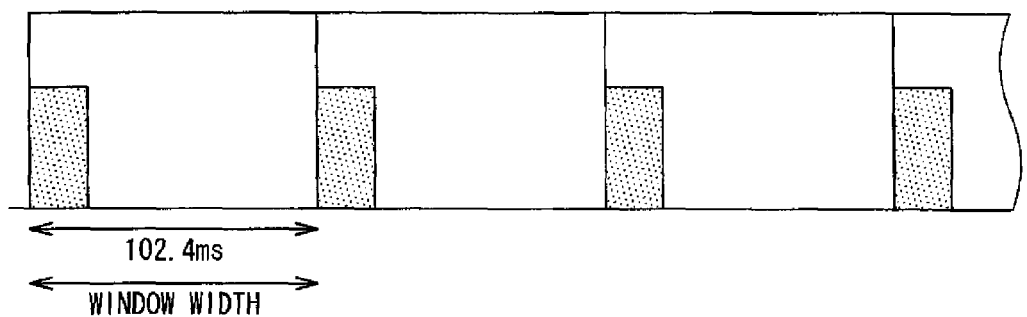
FIGS. 5A and 5B schematically illustrate a signal pattern obtained for each detection window.
Figure 5B:
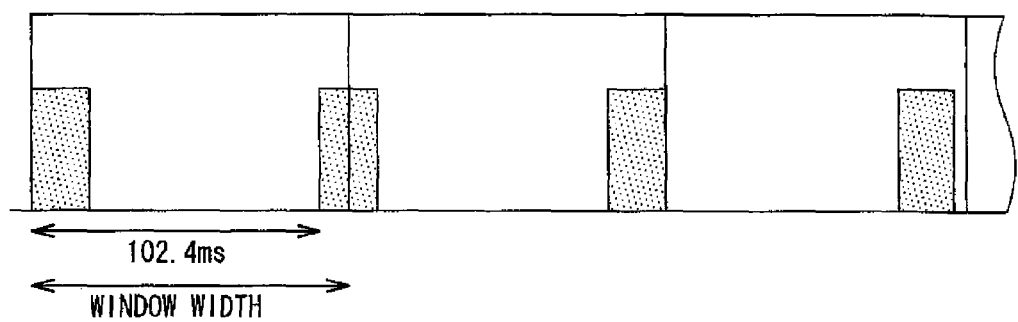

FIGS. 5A and 5B schematically illustrate a signal pattern obtained for each detection window.

FIG. 5A illustrates an example in which a window width matches a period of a periodic signal. FIG. 5B illustrates an example in which the window width does not match the period.

In the detection window, time moves in a direction from left to right in the FIGS. 5A and 5B. Hereinafter, a signal detection time in a detection window is referred to as a signal detection position. The length corresponding to a period of one detection window is referred to as a "window width".

As illustrated in FIG. 5A, when the window width matches the period of a periodic signal transmitted in a period of 102.4 ms, the periodic signal appears in the same position of each window width. Thus, the radio signal detection circuit 23 can correctly detect the periodic signal.

Meanwhile, as illustrated in FIG. 5B, when the window width does not match the period of the periodic signal (the period of the detection window becomes large), a signal pattern (periodic signal appearing position) in each detection window does not match. Thus, the radio signal detection circuit 23 may be not capable of detecting the periodic signal as a radio signal transmitted in a constant period.

When a frequency changes with a change in the ambient temperature of the reference frequency generating circuit 41, the window width does not match the period of the periodic signal. As a result, the radio signal detection circuit 23 detects the periodic signal as a signal having a burst property like a data signal or a different periodic signal.

Moreover, from the point of view of power saving, the radio signal detection circuit 23 is configured to perform intermittent operation composed an active period and a standby period. The radio signal detection circuit 23 performs intermittent operation, for example, being active for a second every 10 seconds. As described above, the frequency changes under the influence of a change in temperature, and thus the radio signal detection circuit 23 has a possibility that detection positions of the periodic signal in each active period is remarkably different.

Figure 6:
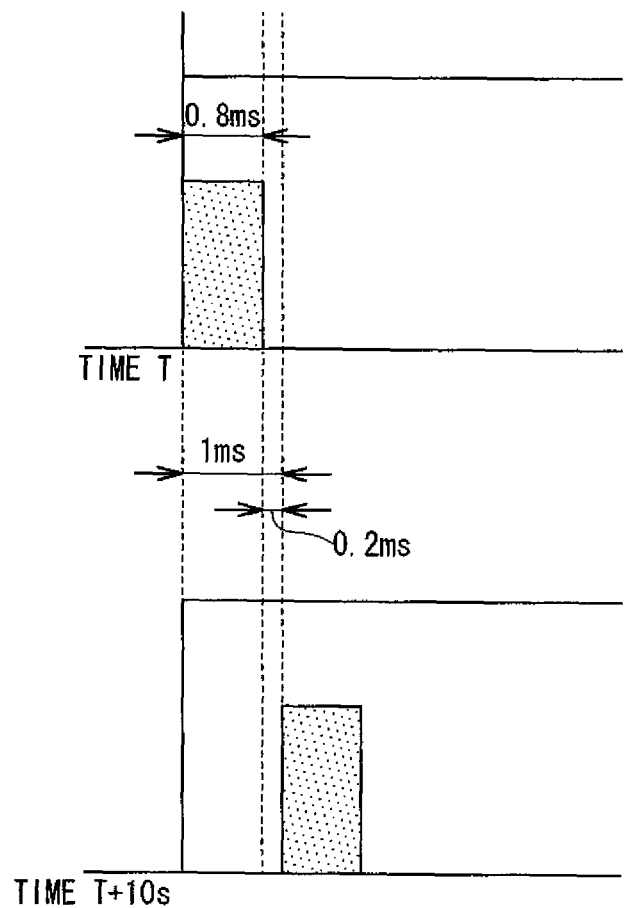
FIG. 6 describes a mismatch of detection times of a periodic signal in a continuous active period.

FIG. 6 describes a mismatch of detection times of a periodic signal in a continuous active period.

The upper portion of FIG. 6 illustrates a detection position of a periodic signal in a detection window at a time T. The lower portion of FIG. 6 illustrates a detection position of the periodic signal in the detection window 10 seconds later from the time T.

For example, when the reference frequency generating circuit 41 contains a deviation of 100 ppm, the difference between the detection time of a periodic signal detected 10 seconds later and the reference frequency is 1 ms. When the transmission time (pulse width) of a beacon signal for wireless LAN communication is 0.8 ms (generally 0.8 ms to 1.6 ms), the interval between the detection end time of a beacon signal detected at time T and the detection start time of a beacon signal detected 10 seconds later from the time T is 0.2 ms. For this reason, there is a high possibility that the detection is made such that a beacon signal detected at time T is different from a beacon signal detected 10 seconds later from the time T.

When an error occurs in a reference frequency supplied from the reference frequency generating circuit 41, namely, when a window width does not match the period of a periodic signal, the cell phone 1 according to the present embodiment autonomously performs a window width correction by adjusting the number of available registers corresponding to the window width with a periodic signal.

Figure 7:
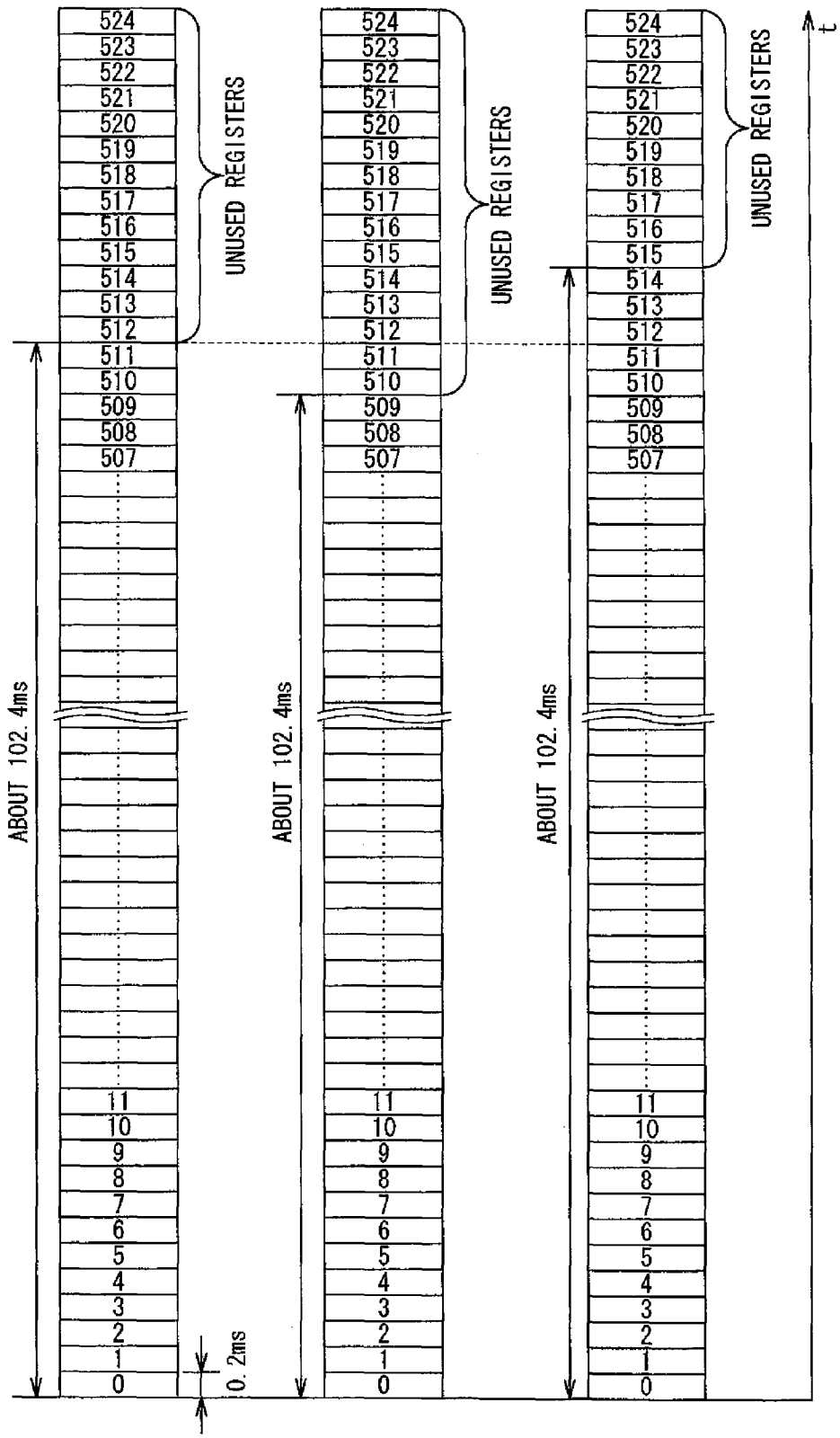
FIG. 7 illustrates a configuration example of registers.

FIG. 7 illustrates a configuration example of registers.

The number of registers to be prepared exceeds a reference value of 512. (524 registers in FIG. 7). For this reason, when a reference frequency supplied from the reference frequency generating circuit 41 becomes small, namely, when the window width is larger than the period of the periodic signal, the radio signal detection circuit 23 reduces the number of registers in the window width to less than 512 depending on the difference. On the contrary, when the reference frequency becomes large, namely, when the window width is smaller than the period of the periodic signal, the radio signal detection circuit 23 increases the number of registers in the window width to more than 512 depending on the difference.

For example, when the reference frequency is accurate, as illustrated in the upper portion of FIG. 7, 512 registers numbered from 0 to 511 are used to detect a periodic signal in one detection window. When the reference frequency becomes small, as illustrated in the middle portion FIG. 7, 510 registers numbered from 0 to 509 are used. When the reference frequency becomes large, as illustrated in the lower portion of FIG. 7, 515 registers numbered from 0 to 514 are used.

Hereinafter, the description will focus on a correction process of a detection window to be performed by adjusting the number of registers to be used specifically.

The detection window correction process is performed based on a periodic signal transmitted from a circuit operating based on a reference frequency supplied from a reference frequency generating circuit with higher precision than the precision of the reference frequency generating circuit 41.

Examples of the periodic signal which can be used for this correction process may include a periodic signal transmitted to an external device from the wireless communication module 26, and a periodic signal transmitted from the wireless communication module 26 etc. to the radio signal detection circuit 23 for the correction process. The CPU 15 switches the antenna switch 62 during correction process so as to prevent the radio signal detection circuit 23 from erroneously detecting external noise. For example, when the antenna switch 62 is switch state A3, the radio signal detection circuit 23 is not connected to the monopole antenna 61. Thus, the radio signal detection circuit 23 can perform the correction process without erroneously detecting external noise by leakage current of the periodic signal transmitted to an external device from the wireless communication module 26 and by leakage current running through a substrate inside the cell phone 1.

The correction process is performed using a signal pattern obtained in each of the detection windows detected by the radio signal detection circuit 23. More specifically, the radio signal detection circuit 23 performs the correction process using a length of a high level period and the detection position (detection time) in the detection window. The length of the high level period is acquired by the number of registers indicating a high level. Hereinafter, an example of a method of acquiring a length of a high level period will be described.

Figure 8:
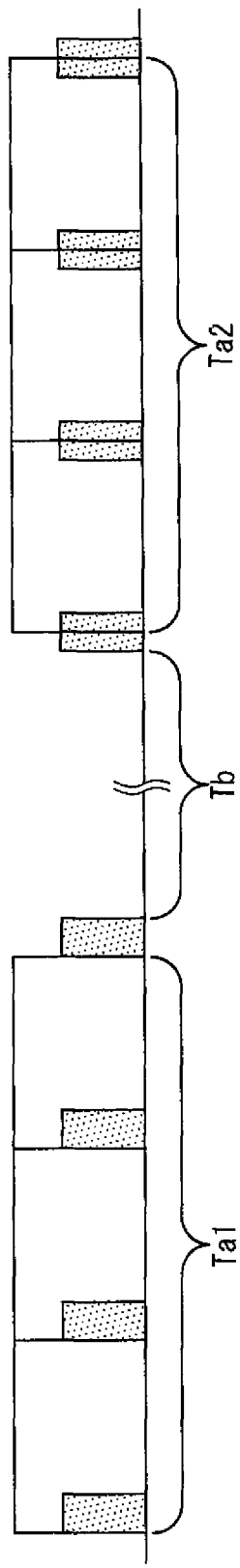
FIG. 8 illustrates a signal pattern detected in detection windows when a radio signal detection circuit is intermittently operating.

FIG. 8 illustrates a signal pattern detected in detection windows when the radio signal detection circuit 23 is intermittently operating.

Periods Ta1 and Ta2 are active periods when the radio signal detection circuit 23 is intermittently operating. In other words, the radio signal detection circuit 23 detects a periodic signal in periods Ta1 and Ta2. A period Tb is an standby period when the radio signal detection circuit 23 is intermittently operating. In other words, the radio signal detection circuit 23 does not detect a periodic signal in the period Tb.

As described above, the precision of the reference frequency generating circuit 41 has a deviation from a center frequency under changing in temperature (predetermined condition). In addition, the radio signal detection circuit 23 receives a periodic signal based on such an intermittent operation. Therefore, if such an error is not considered, the radio signal detection circuit 23 may detect such that a signal detected in the active period Ta2 following the standby period Tb is different from a signal detected in the active period Ta.

The radio signal detection circuit 23 acquires a time control signal, for example, from a result of detecting a plurality of detection windows acquired in one active period, namely, a signal pattern. The time control signal is correction data used for detection window correction process. The time control signal is a signal indicating a signal pattern acquired by adding or integrating each signal pattern of detection windows with respect to the time axis (hereinafter referred to simply as "adding or integrating a detection window"). Incidentally, when the radio signal detection circuit 23 does not perform intermittent operation, the signal pattern indicates a signal pattern acquired by adding or integrating a predetermined number of detection windows. Specifically, the time control signal indicates a length indicating a high level period after addition or integration (hereinafter referred to as "high level length") and a length indicating a low level period (hereinafter referred to as "low level length"). For example, when the repeated addition count is set to 20, the radio signal detection circuit 23 acquires the signal pattern acquired by adding 20 detection windows as one time control signal. It is preferable that the number of additions and integrations is set depending on the error (precision) of the high-precision reference frequency generating circuit 51.

Incidentally, it is preferable to determine the interval of intermittent operation depending on the error (precision) of the high-precision reference frequency generating circuit 51, namely, the error of the periodic signal. This is because the radio signal detection circuit 23 can maintain the precision of detection of a periodic signal by considering the error of the high-precision reference frequency generating circuit 51.

Figure 9:
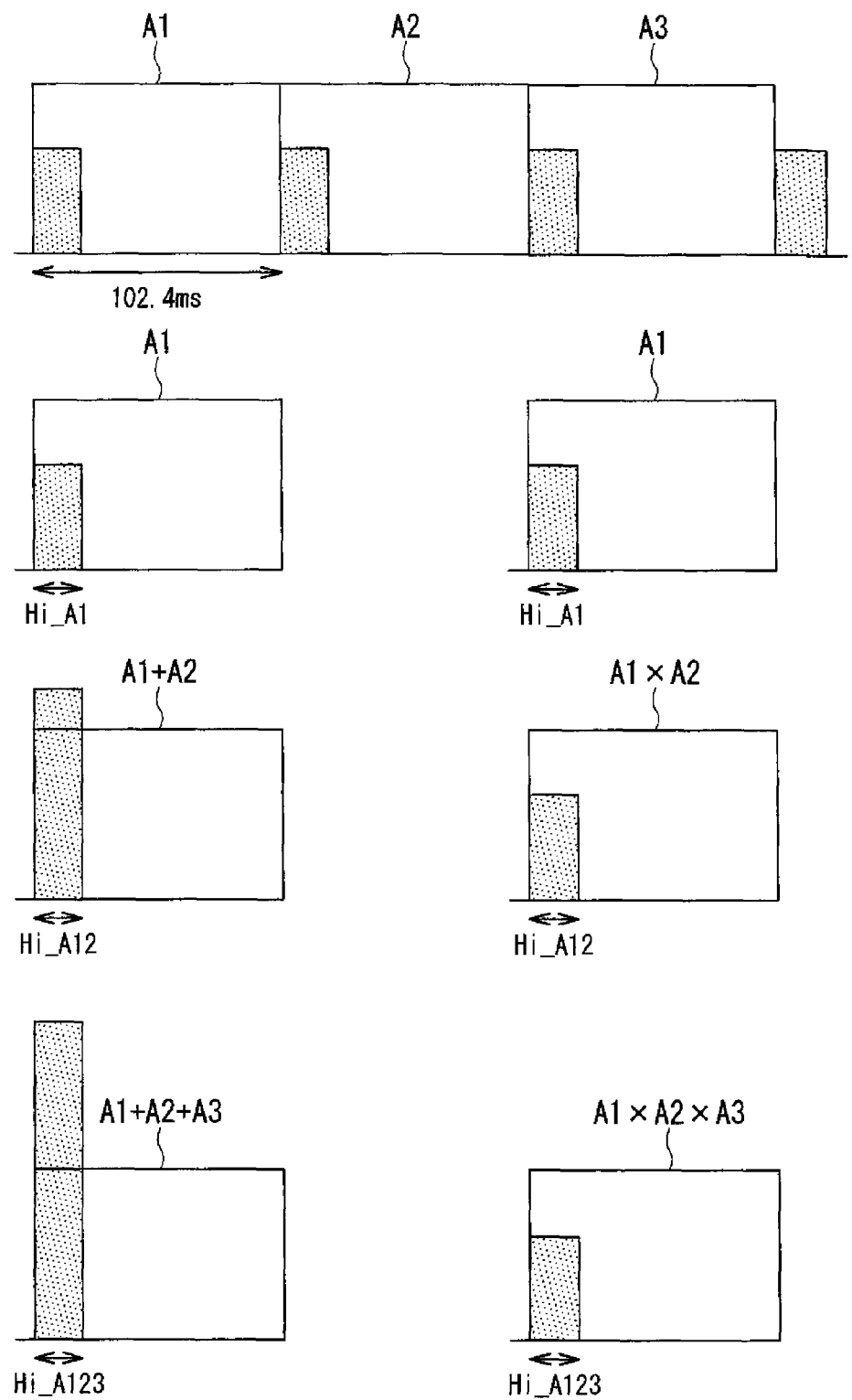
FIG. 9 describes addition and integration of detection windows when a window width matches a period of a periodic signal.

FIG. 9 describes addition and integration of detection windows when a window width matches a period of a periodic signal.

Figure 10:
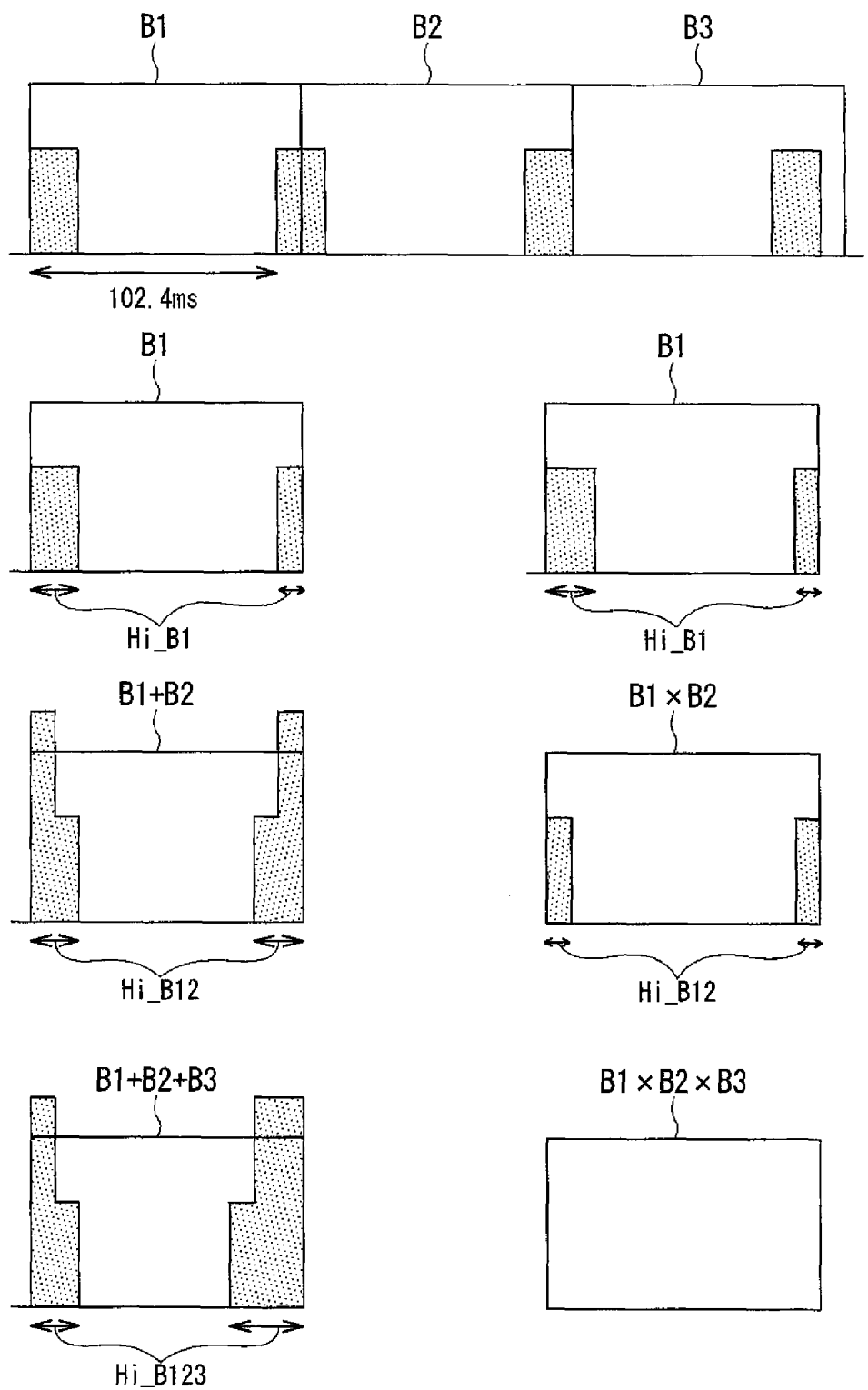
FIG. 10 describes addition and integration of detection windows when a window width does not match a period of a periodic signal.

FIG. 10 describes addition and integration of detection windows when a window width does not match a period of a periodic signal.

Incidentally, FIGS. 9 and 10 illustrate an example in which the radio signal detection circuit 23 detects a periodic signal with a period of 102.4 ms.

The radio signal detection circuit 23 adds a plurality of detection windows by matching the time axis. As illustrated in FIG. 9, when the signal patterns of the detection window A1 and the detection window A2 are added, a signal pattern having a high level length Hi_A12 is obtained as illustrated in a window (A1+A2). When the signal patterns of the detection window A1 and the detection window A2 and the detection window A3 are added, a signal pattern having a high level length Hi_A123 is obtained as illustrated in a window (A1+A2+A3). When the window width matches the period of a periodic signal, the high level lengths: Hi_A1 of the detection window A1, Hi_A12, and Hi_A123 are the same.

When the signal patterns of the detection window A1 and the detection window A2 are performed AND operation, a signal pattern having a high level length Hi_A12 is obtained as illustrated in a window (A1×A2). When the signal patterns of the detection window A1 and the detection window A2 and the detection window A3 are performed AND operation, a signal pattern having a high level length Hi_A123 is obtained as illustrated in a window (A1×A2×A3). When the window width matches the period of a periodic signal, the high level lengths: ΔHi_A1 of the detection window A1, Hi_A12, and Hi_A123 are the same.

In contrast, as illustrated in FIG. 10, when the signal patterns of the detection window B1 and the detection window B2 are added, a signal pattern having a high level length Hi_B12 is obtained as illustrated in a window (B1+B2). When the signal pattern of the detection window B1 and the detection window B2 and the detection window B3 are added, a signal pattern having a high level length Hi_B123 is obtained as illustrated in a window (B1+B2+B3). When the window width does not match the period of a periodic signal, each of the high level lengths: Hi_B1 of the window B1, Hi_B12, and Hi_B123 is different from each other. In other words, the high level length after addition becomes gradually large for each addition.

When the signal patterns of detection window B1 and the detection window B2 are performed AND operation, a signal pattern having a high level length Hi_B12 is obtained as illustrated in a window (B1×B2). When the signal patterns of detection window B1 and the detection window B2 and the detection window B3 are performed AND operation, a signal pattern having a high level length Hi_B123 (none in FIG. 10) is obtained as illustrated in a window (B1×B2×B3). When the window width does not match the period of a periodic signal, each of the high level lengths: Hi_B1 of the window B1, Hi_B12, and Hi_B123 is different from each other.

Incidentally, the time control signal may be acquired not only by adding or integrating a predetermined number of detection windows but also by using the signal pattern of a detection window as is as the time control signal.

The following description will focus on the detection window correction process which changes a window width Tw by a T step and determines the window width Tw with a minimum difference between the window width and the period of the periodic signal.

Figure 11:
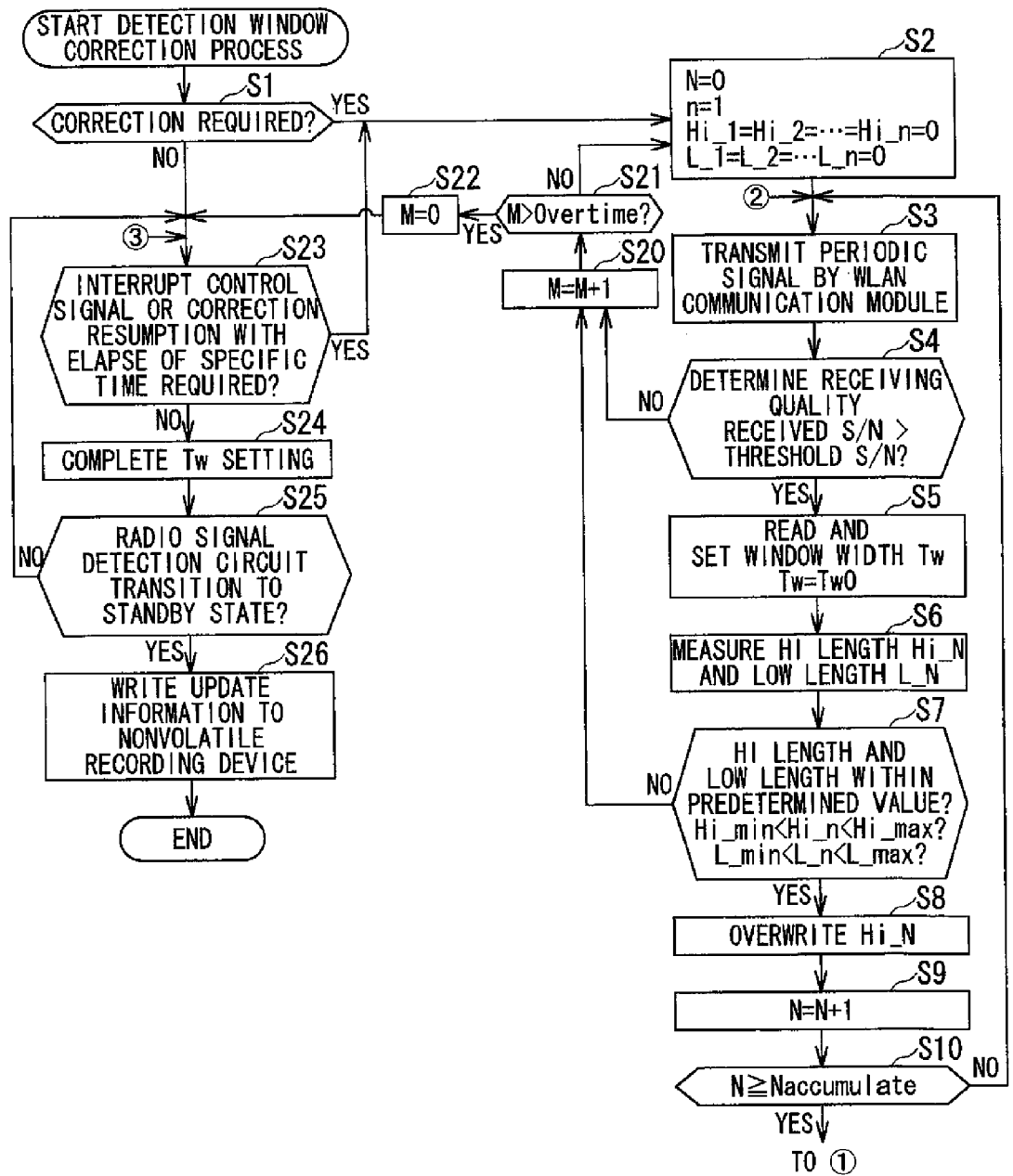
FIG. 11 is a flowchart describing a detection window correction process executed by a cell phone according to a present embodiment.

FIG. 11 is a flowchart describing a detection window correction process executed by the cell phone 1 according to the present embodiment.

Figure 12:
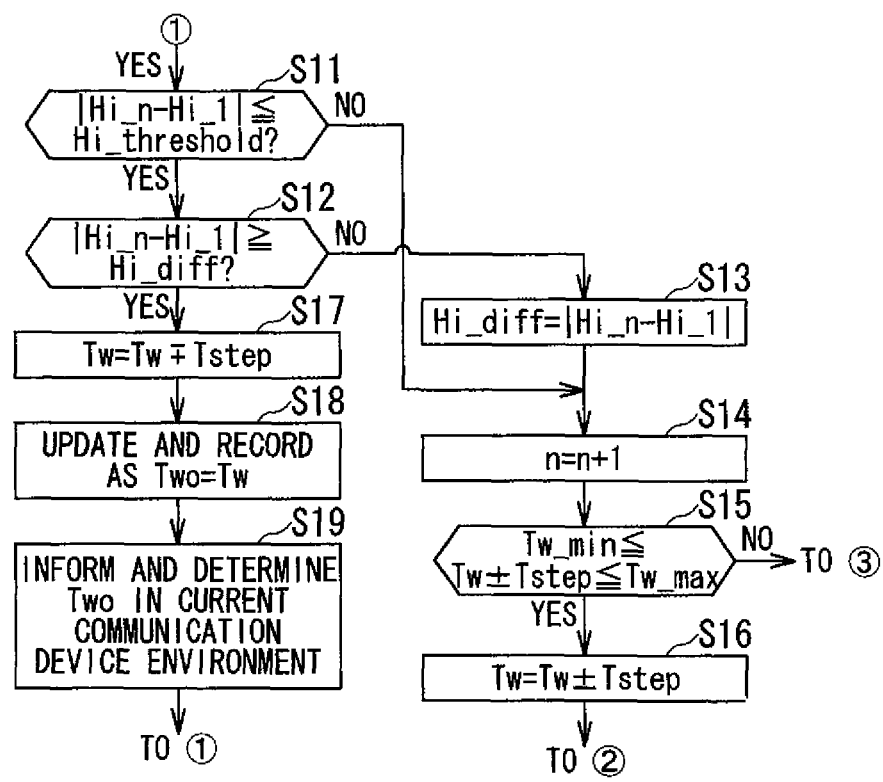
FIG. 12 is a flowchart describing a process following FIG. 11.

FIG. 12 is a flowchart describing a process following FIG. 11.

Incidentally, in the following correction process, a description here is made on a case where the radio signal detection circuit 23 is used as the subject of a sentence describing the step mainly executed by the radio signal detection circuit 23. In addition, a description is made on a case where the WLAN communication module 12 is used as the wireless communication module 26 transmitting a periodic signal used for the correction process.

Moreover, the correction process starts at a predetermined timing such as at initialization when the WLAN communication module 12 starts wireless LAN communication with other communication devices.

In step S1, the CPU 15 determines whether the window width correction is required or not. The CPU 15 determines based on information on correction execution timing (e.g., correction execution interval) set by the user. If the CPU 15 determines that correction is not required (step S1: NO), the process proceeds to the correction determination step S23.

If the CPU 15 determines that the window width correction is required (step S1: Yes), the radio signal detection circuit 23 initializes each value required for correction and stored in the storage unit 37 in step S2. Specifically, the radio signal detection circuit 23 sets the number of repetitions "N" of adding or integrating detection windows (hereinafter referred to simply as the repeated addition count) to "0" (N=0). In addition, the radio signal detection circuit 23 sets the acquisition count "n" of a time control signal to "1" (n=1). Further, the radio signal detection circuit 23 sets an n-th acquired a high level length and a low level length to "0" (Hi_1=Hi_2= . . . =Hi_n=0, L_1=L_2= . . . =L_n=0). Incidentally, the high level or low level length is expressed, for example, by the number of registers indicating each level.

In step S3, the WLAN communication module 12 transmits a periodic signal. The WLAN communication module 12 transmits the periodic signal, for example, when an instruction is received from the CPU 15. The radio signal detection circuit 23 stores the periodic signal received from the WLAN communication module 12 in the storage unit 37. Incidentally, it is preferable that at this time, the radio signal detection circuit 23 does not detect a signal other than the periodic signal transmitted from the WLAN communication module 12 by controlling an input power level and a threshold set for the signal identification circuit 34.

In step S4, the radio signal detection circuit 23 determines whether a S/N (signal-noise) ratio (received S/N) of a received periodic signal is larger than a threshold for determining the receiving quality (threshold S/N) (received S/N>threshold S/N). The quality determination step S4 is executed to determine whether the window width can be corrected based on a signal having a constant quality. If the radio signal detection circuit 23 determines that the S/N ratio of the received periodic signal is equal to or less than the threshold S/N ratio (step S4: NO), namely, if the radio signal detection circuit 23 determines that a required receiving quality is not obtained, the process proceeds to step S20.

If the radio signal detection circuit 23 determines that the S/N ratio of the received periodic signal is larger than the threshold S/N ratio (step S4: YES), namely, if the radio signal detection circuit 23 determines that a required receiving quality is obtained, the process proceeds to step S5. In step S5, the radio signal detection circuit 23 reads an initial window width Tw0 stored in advance in the storage unit 37 and sets the initial window width Tw0 as the window width Tw used to detect the periodic signal. The radio signal detection circuit 23 determines the number of registers used for signal detection by this window width Tw0. It is preferable that the initial window width Tw0 is set to a value obtained by a peak value of an inverse square characteristic of the frequency tolerance over temperature of the reference frequency generating circuit, for example, as illustrated in FIG. 3. The change in reference frequency is limited to a change in a reducing direction and thus the radio signal detection circuit 23 can limit only to the correction in a direction of increasing the window width, which can simplify the correction process. In contrast to this, if the window width Tw0 is set without considering the value obtained by the peak value, two types of correction are required, one in a direction of increasing the window width and one in a direction of reducing the window width. This involves an unnecessary increase in correction time and complicated circuit.

In step S6, the radio signal detection circuit 23 measures a high level length Hi_n and a low level length L_n from a signal pattern detected in one detection window. When a high level signal is detected, the radio signal detection circuit 23 stores information indicating a high level in a register. When a low level signal is detected, the radio signal detection circuit 23 stores information indicating a low level in a register. The radio signal detection circuit 23 measures each of the high level length Hi_n and the low level length L_n from the information indicating a signal level stored in the register (i.e., signal pattern).

In step S7, the radio signal detection circuit 23 determines whether the high level length Hi_n is in a range from a preset minimum Hi_min to maximum value Hi_max of the high level length (Hi_min<Hi_n<Hi_max). In addition, the radio signal detection circuit 23 determines whether the low level length L_n is in a range from a preset minimum L_min to maximum L_max of the low level length (L_min<L_n<L_max). The radio signal detection circuit 23 determines whether the high level length and the low level length measured in the measurement step S6 are in a predetermined range, which determines whether the high level length and the low level length are correctly measured (check erroneous detection) in the step S7. If the radio signal detection circuit 23 determines that the high level length or the low level length is not in a range of respective minimum to maximum values (step S7: NO), the process proceeds to step S20.

If the radio signal detection circuit 23 determines that each of the high level length and the low level length is in a range from a predetermined respective minimum to maximum values (step S7: YES), the process proceeds to step S8. In the step S8, the radio signal detection circuit 23 overwrites the value of the high level length Hi_n.

In step S9, the radio signal detection circuit 23 increments the current repeated addition count "N" by 1 (N=N+1). Incidentally, it is preferable that the radio signal detection circuit 23 starts storing in the storage unit 37 at a timing when the CPU 15 is activating. This is because while the CPU 15 is activating, a large power consumption occurs on the host side. Therefore, power consumption required for correction process by the radio signal detection circuit 23 is negligible small.

In step S10, the radio signal detection circuit 23 determines whether the current repeated addition count "N" is equal to or greater than a preset repeated addition count Naccumulate (N≥Naccumulate). If the radio signal detection circuit 23 determines that the current repeated addition count "N" is less than the preset repeated addition count Naccumulate (step S10: NO), the process returns to the signal transmission step S3. More specifically, the radio signal detection circuit 23 repeats the signal transmission step S3 to the repetition count determination step S10 until the current repeated addition count "N" reaches the repeated addition count Naccumulate or more.

If the radio signal detection circuit 23 determines that the current repeated addition count "N" is equal to or greater than the repeated addition count Naccumulate (step S10: YES), the process proceeds to step S11 of FIG. 12. In the step S11, the radio signal detection circuit 23 determines whether the difference between the high level length Hi_n of a time control signal acquired by an n-th detection and the high level length Hi_1 of a time control signal acquired by the first detection is equal to or less than a predetermined Hi_threshold (|Hi_n−Hi_1|≤Hi_threshold). As illustrated in FIG. 10, the window width causes an error with a change in reference frequency. Therefore, the more the time control signal acquisition count "n" increases, the more the error of the high level length of the time control signal increases. Thus, the first high level length Hi_1 is used as the reference value. Incidentally, the radio signal detection circuit 23 may use a time control signal acquired by other than the first detection.

Figure 13:
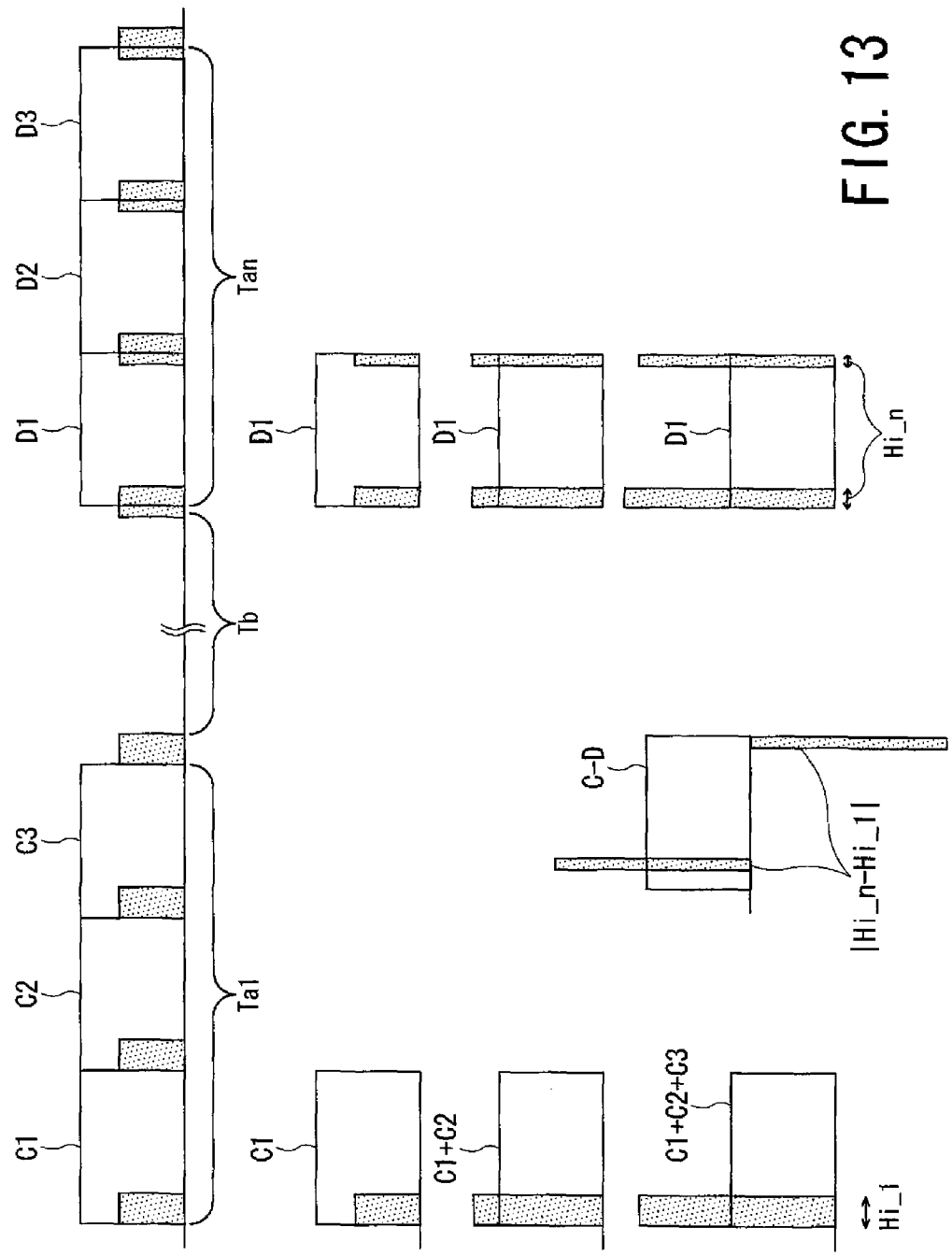
FIG. 13 is a schematic drawing when the difference of a high level length is calculated.

FIG. 13 is a schematic drawing when the difference of the high level length is calculated.

FIG. 13 describes an example in which three detection windows in one active period are added to form a time control signal.

A high level length Hi_1 of a time control signal is obtained by adding three detection windows C1, C2, and C3 in a first active period Ta1. A high level length Hi_n of a time control signal is obtained by adding three detection windows D1, D2, and D3 in an n-th active period Tan. The radio signal detection circuit 23 calculates a difference between the high level lengths Hi_1 and Hi_n. Then, the radio signal detection circuit 23 can obtain |Hi_n−Hi_1| as illustrated in a window (C-D). The radio signal detection circuit 23 determines whether the |Hi_n−Hi_1| is equal to or less than a predetermined value Hi_threshold.

If the radio signal detection circuit 23 determines that the difference between the high level length Hi_n and the high level length Hi_1 is larger than the predetermined value Hi_threshold (step S11: NO), the process proceeds to an addition step S14.

On the contrary, if the radio signal detection circuit 23 determines that the difference between the high level length Hi_n and the high level length Hi_1 is equal to or less than the predetermined value Hi_threshold (step S11: YES), the process proceeds to step S12. In the step S12, the radio signal detection circuit 23 determines whether the difference between the high level length Hi_n and the high level length Hi_1 is equal to or larger than the predetermined value Hi_diff (|Hi_n−Hi_a|≥Hi_diff). The predetermined value Hi_diff is a difference (hereinafter referred to as "previous difference") between the high level length Hi_n−1 of an n−1 acquired time control signal set in step S13 described later and the high level length Hi_1 of the first acquired time control signal. More specifically, the previous difference determination step S12 is a process of determining whether the difference between the high level length Hi_n of a currently acquired time control signal and the high level length Hi_1 is equal to or larger than the difference between the high level length Hi_n−1 of a previously acquired time control signal and the high level length Hi_1.

If the difference between the high level lengths Hi_n and Hi_1 is equal to or larger than the previous difference Hi_diff, the radio signal detection circuit 23 can determine that the difference between the current and previous window widths and the period of the periodic signal is equal to or less than an acceptable value (Hi_threshold) and the window width correction (step S16) performed at an n−1-th count of detection is more appropriate than that performed at an n-th count.

Incidentally, the high level length Hi_1 of the first acquired time control signal does not have a previous difference. For this reason, an appropriate vale (e.g., Hi_diff=100) is set as an initial value to Hi_diff in advance.

If the radio signal detection circuit 23 determines that the difference between Hi_n and Hi_1 is less than the previous difference Hi_diff (step S12: NO), the process proceeds to step S13. In the step S13, the radio signal detection circuit 23 updates the previous difference Hi_diff to the difference between the high level lengths Hi_n and Hi_1 (Hi_diff=|Hi_n−Hi_1|).

Then, the radio signal detection circuit 23 stores the new previous difference Hi_diff in the storage unit 37.

In step S14, the acquisition count "in" of a time control signal is incremented by 1 (n=n+1).

In step S15, the radio signal detection circuit 23 determines whether the value (Tw±Tstep) obtained by adding (or subtracting) a predetermined value Tstep to (or from) the current window width Tw is in a range from a preset acceptable minimum Tw_min to maximum Tw_max of the window width Tw (Tw_min≤Tw±Tstep≤Tw_max). The predetermined value Tstep is a preset amount of window width (number of registers and hereinafter referred to as "step width") subjected to addition or subtraction for one correction of the window width.

If the radio signal detection circuit 23 determines that the window width Tw±Tstep is in a range from the minimum Tw_min to the maximum Tw_max (step S15: YES), the radio signal detection circuit 23 sets the value obtained by adding (or subtracting) the step width Tstep to (or from) the current window width Tw as the window width Tw (Tw=Tw±Tstep) in the step S16. Specifically, the radio signal detection circuit 23 increases or decreases the period of the detection window. Then, the process returns to the predetermined signal transmission step S3 of FIG. 11. The radio signal detection circuit 23 repeats the process until an optimal window width Tw is determined to be set in the previous difference determination step S12 of FIG. 12.

Meanwhile, if the radio signal detection circuit 23 determines that the window width Tw±Tstep is not in a range from the minimum Tw_min to the maximum Tw_max (step S15: NO), the process proceeds to correction determination step S23 of FIG. 11. In other words, the radio signal detection circuit 23 determines that the correction failed.

If the radio signal detection circuit 23 determines in the previous difference determination step S12 of FIG. 12 that the difference between Hi_n and Hi_1 is equal to or larger than the previous difference Hi_diff (step S12: YES), the radio signal detection circuit 23 sets the window width Tw in the step S17. More specifically, the radio signal detection circuit 23 corrects the window width Tw by subtracting (or adding) the step width Tstep from (or to) the window width Tw (Tw=Tw±Tstep). If the window width is added in the previous window width correction step S16, the radio signal detection circuit 23 subtracts the step width Tstep from the current window width Tw in the window width correction step S17. On the contrary, if the window width is subtracted in the previous window width correction step S16, the radio signal detection circuit 23 adds the step width Tstep to the window width Tw. In other words, the window width is returned to the window width Tw set at an n−1-th detection in the window width setting step S16. This is because the window width Tw set at the previous (n−1) correction is more appropriate.

In step S18, the radio signal detection circuit 23 updates the corrected window width Tw to the initial window width Tw0 and stores the updated window width Tw in the storage unit 37. In step S19, the radio signal detection circuit 23 informs the CPU 15 that the window width Tw was corrected. Thus, the window width Tw0 is determined by reference to the time based on a reference frequency supplied from the current reference frequency generating circuit 41. The radio signal detection circuit 23 detects the specific pattern of a signal transmitted from other communication device such as an AP and a PC based on the window width Tw0. Then, the process moves to the correction determination step S23 of FIG. 11.

If the radio signal detection circuit 23 determines that the predetermined receiving quality is less than the threshold S/N ratio (step S4 of FIG. 11: NO) or if the radio signal detection circuit 23 determines that the high level length Hi_n or the low level length L_n is in the predetermined range (step S7: NO), the process proceeds to step S20 of FIG. 11. The radio signal detection circuit 23 increments the receiving failure count "M" indicating the number of failures to receive the periodic signal by 1 (M=M+1) in the step 20.

In step S21, the radio signal detection circuit 23 determines whether the receiving failure count "M" is larger than a predetermined value Overtime. This step S21 is provided to prevent the radio signal detection circuit 23 from infinitely attempting to receive a periodic signal although a required receiving quality is not obtained. If the radio signal detection circuit 23 determines that the receiving failure count "M" is equal to or less than the predetermined value Overtime (step S21: NO), the process returns to the initialization step S2. Subsequent processes are repeated.

If the radio signal detection circuit 23 determines that the receiving failure count "M" is larger than the predetermined value Overtime (step S21: YES), the radio signal detection circuit 23 sets the receiving failure count "M" to 0 (M=0) in the step S22. Then, the process proceeds to a correction determination step S23.

In step S23, the CPU 15 determines whether the radio signal detection circuit 23 detects an interrupt control signal or the CPU 15 determines whether the timing of executing the window width correction comes with an elapse of a specific time. If the CPU 15 determines that an interrupt control signal is detected or the timing of executing the correction comes (step S23: YES), the process returns to the initialization step S2.

On the contrary, if the CPU 15 determines that no interrupt control signal is detected or the timing of executing the correction has not come (step S23: NO), the CPU 15 sets the initial window width Tw0 as the window width Tw used by the radio signal detection circuit 23 for signal detection in the step S24.

In step S25, the CPU 15 determines whether the radio signal detection circuit 23 transitions to a standby state. If the CPU 15 determines that the radio signal detection circuit 23 is maintained to be in an active state (step S25: NO), the process returns to the correction determination step S23, in which the subsequent processes are repeated.

On the contrary, if the CPU 15 determines that the radio signal detection circuit 23 transitions to an standby state (step S25: YES), the CPU 15 writes data required for the radio signal detection circuit 23 to detect a signal to a predetermined nonvolatile recording device in the step S26. Incidentally, this writing step S26 can be omitted if the radio signal detection circuit 23 has a nonvolatile recording device.

Thus, the detection window correction process completes.

Incidentally, in the above described detection window correction process in FIGS. 11 and 12 a determination is made based on the difference between high level lengths Hi_n and Hi_1 as to whether the window width is appropriate or not. However, the determination as to whether the window width is appropriate or not may be made using other methods described below.

Figures 14A, 14B:
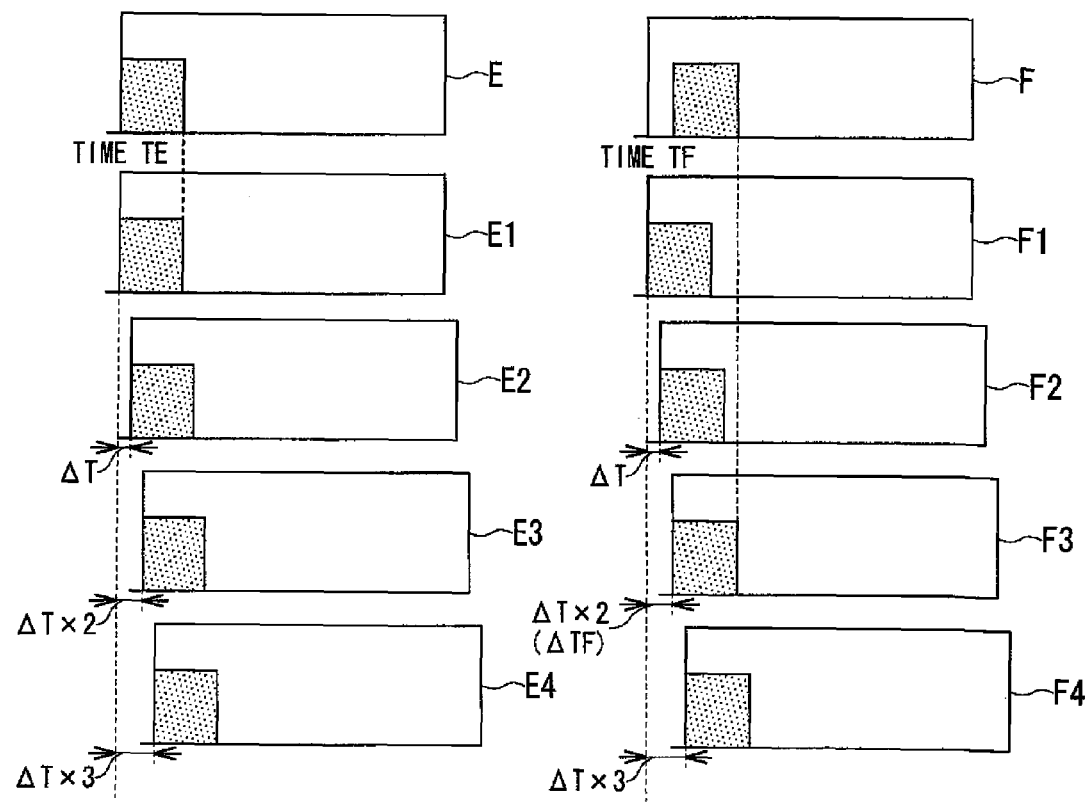
FIGS. 14A and 14B are a schematic drawing describing another detection window correction process.

FIGS. 14A and 14B are a schematic drawing describing another detection window correction process.

In this detection window correction process, the radio signal detection circuit 23 performs an AND operation between an n-th acquired time control signal and a past time control signal. A start position of the past time control signal is shifted by one sampling pitch from the start position (start time) of the n-th acquired time control signal. The radio signal detection circuit 23 calculates a shift amount of the past time control signal having a maximum correlation with an n-th detected time control signal. The radio signal detection circuit 23 can calculate the necessary correction amount (shift amount) of a detection window from this shift amount.

For example, the radio signal detection circuit 23 uses a time control signal obtained in the first active period of an intermittent operation as the past time control signal. A time control signal obtained in an n-th active period is a current time control signal subjected to correction process using the past time control signal.

For example, as illustrated in FIG. 14A, in an n-th acquisition count, the radio signal detection circuit 23 obtains a time control signal having a signal pattern illustrated in a detection window. The radio signal detection circuit 23 slides the window start position of the first acquired (past) time control signal having a signal pattern illustrated in a correction window E1 by a predetermined amount $\Delta T$ (corresponding to one sampling pitch) as illustrated in correction windows E2, E3, and E4. The correction window E1 is a window whose window start time matches the start time TE of the detection window E. The correction window E2 is a window whose window start position slides from the correction window E1 by a predetermined amount $\Delta T$ ($\Delta T$ from the detection window E). Further, the correction window E3 is a window whose window start position slides from the correction window E2 by a predetermined amount $\Delta T$ ($\Delta T \times 2$ from the detection window E). The above is applied to the correction detection window E4 in the same manner.

The radio signal detection circuit 23 performs an AND operation between each of these correction windows E1 to E4 (past time control signal whose start position is shifted) and an n-th acquired time control signal. The radio signal detection circuit 23 obtains a correction window having a maximum correlation from among the correction windows E1 to E4. In FIG. 14A, the radio signal detection circuit 23 obtains the correction detection window E1 as the correction window having a maximum correlation. The radio signal detection circuit 23 can determine that no correction is required (correction amount of 0) since there is no difference between the start position of the detection window E and the start position of the correction window E1.

As illustrated in FIG. 14B, in an n-th acquisition count, the radio signal detection circuit 23 obtains a time control signal having a signal pattern illustrated in a detection window F. The radio signal detection circuit 23 slides the window start position of the first acquired (past) time control signal having a signal pattern illustrated in a correction window F1 by a predetermined amount $\Delta T$ (corresponding to one sampling pitch) in correction windows F2, F3, and F4 as illustrated. The radio signal detection circuit 23 performs an AND, operation between each of these correction windows F1 to F4 (past time control signal whose start position is shifted) and an n-th acquired time control signal. The radio signal detection circuit 23 obtains a correction window having a maximum correlation from among the correction windows F1 to F4.

In FIG. 14B, the radio signal detection circuit 23 obtains the correction detection window F3 as the correction window having a maximum correlation. The radio signal detection circuit 23 calculates the difference $\Delta TF$ between the start position of the detection window F and the start position of the correction window F3. Then, based on this difference, the radio signal detection circuit 23 calculates the correction amount. The radio signal detection circuit 23 can calculate an appropriate start position (shift width) of the detection window corresponding to this correction amount, and thus can correct the detection window.

According to the cell phone 1, even the radio signal detection circuit 23, which operates based on a reference frequency supplied from the reference frequency generating circuit 41 which consumes low power but does not have sufficient precision, can correct a detection period using a periodic signal generated based on a higher precision reference frequency. As a result, the cell phone 1 can reduce power consumption of the radio signal detection circuit 23 as well as can detect a receiving signal at high precision.

Moreover, the radio signal detection circuit 23 can perform correction based on a signal by way of each circuit of itself, and thus can perform correction in consideration of various causes contributing to a detection period shift such as ambient temperatures and circuit characteristics. As a result, the radio signal detection circuit 23 can perform easy and accurate correction.

Further, when the internal wireless communication module 26 is used for correction process, the radio signal detection circuit 23 is not affected by noise when a periodic signal is received and can use already-known signals. Thus the cell phone 1 can correct the detection period at higher precision.

Moreover, the cell phone 1 starts the correction process under control of the CPU 15, and thus the radio signal detection circuit 23 and the wireless communication module 26 can easily distinguish between a periodic signal for correction and a transmission of a periodic signal for establishing communication with other device.

Incidentally, the present embodiment describes an example in which the wireless communication module 26 and the radio signal detection circuit 23 share the monopole antenna 61 depending on the state of the antenna switch 62. However, the configuration may be made such that the wireless communication module 26 and the radio signal detection circuit 23 has an antenna separately.

Figure 15:
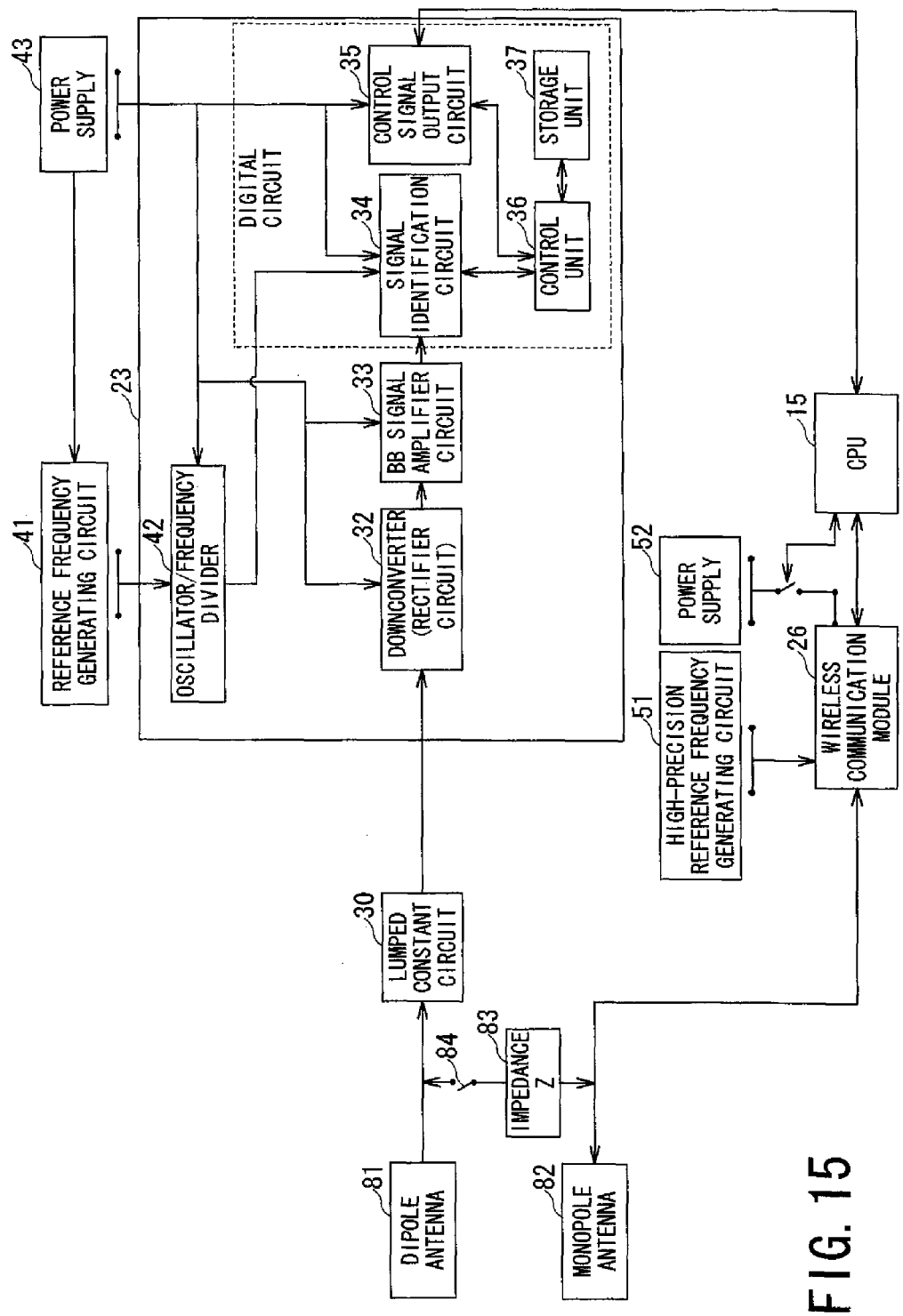
FIG. 15 is a circuit configuration diagram as a modification particularly illustrating a radio signal detection circuit and a wireless communication module.

FIG. 15 is a circuit configuration diagram as a modification particularly illustrating the radio signal detection circuit 23 and the wireless communication module 26.

The circuit configuration of FIG. 15 is different from the circuit configuration of FIG. 2 in including a dipole antenna 81 for exclusive use of the radio signal detection circuit 23 and a monopole antenna 82 for exclusive use of the wireless communication module 26. In addition, the radio signal detection circuit 23 is connected to a signal line connecting the wireless communication module 26 and the monopole antenna 82. Therefore, the radio signal detection circuit 23 can receive a periodic signal transmitted from the wireless communication module 26 through an impedance 83. Since the radio signal detection circuit 23 has a dipole antenna 81, the RF receiving circuit is omitted.

When a correction switch 84 is turned on, the radio signal detection circuit 23 can directly receive a periodic signal transmitted from the wireless communication module 26. Moreover, the radio signal detection circuit 23 can also receive a signal transmitted from the wireless communication module 26 through the monopole antenna 82, through the dipole antenna 81.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The present embodiment performs correction by controlling the window width or the start position. However, for example, when a resonant filter such as an IIR (Infinite Impulse Response) is used, correction can also be performed by switching the frequency dividing ratio.

The CPU 15 determines whether the timing of performing correction is required or not in step S1 or step S23. Alternatively, the radio signal detection circuit 23 may determines whether the timing of performing correction process (timing of storing the periodic signal) is required or not after the WLAN communication module 12 checks whether or not to connect based on an SSID (Service Set Identifier) contained in a beacon signal received from an AP or the like. There is no need for the CPU 15 to activate the WLAN communication module for the correction process. And the cell phone is capable of reducing the power consumption for activation of the WLAN communication module 12.

Moreover, the radio signal detection circuit 23 may detect a wrong specific pattern as a specific pattern of a beacon signal transmitted from an AP or the like and inform the WLAN communication module 12 because of a shift of detection period due to a deviation of the reference frequency from the center frequency. Thus, the WLAN communication module 12 attempts to connect to the AP or the like but fails. In a case where the WLAN communication module 12 fails to establish wireless LAN communication connection, the window width of the radio signal detection circuit 23 may be shifted. In this case, that the WLAN communication module 12 is preferred to transmit a periodic signal for correction process based on an instruction from the CPU 15 or the like, and the radio signal detection circuit 23 performs the correction process.

Further, the radio signal detection circuit 23 may acquire a time control signal using a periodic signal transmitted from an external device. At this time, in order to obtain more accurate time control signal, the radio signal detection circuit 23 is preferred to use a periodic signal transmitted from an external device whose periodic signal has an already-known period (e.g., an already-known transmission period of beacon signal by referencing SSID information).

Further, when the radio signal detection circuit 23 has an infrared communication module or a contactless IC card module, the radio signal detection circuit 23 may use a periodic signal transmitted from these modules.

Still, further the present embodiment describes an example in which the radio signal detection circuit 23 performs intermittent operation, but may always be active.

What is claimed is:

1. A communication device comprising:
a reference frequency generating unit configured to generate a first reference frequency having a deviation from a center frequency under a predetermined condition; and
a radio signal detection unit configured to operate in a detection period based on the first reference frequency and to detect an incoming periodic radio signal, wherein the incoming periodic signal is generated based on a second reference frequency having higher precision than a precision of the first reference frequency;
wherein the detection period is a period of a detection window for acquiring a detection result of the incoming periodic signal in a period corresponding to a period of the incoming periodic signal; and wherein the radio signal detection unit:
  (i) generates a time control signal from a signal pattern comprising a high level and a low level in the detection window;
  (ii) performs an AND operation between an acquired time control signal and a past time control signal whose start time is shifted by a predetermined sampling pitch from a start time of the acquired time control signal;
  (iii) obtains a shift amount having a maximum correlation; and
  (iv) corrects the detection period by increasing or decreasing the period of the detection window based on the shift amount.

2. The communication device according to claim 1, further comprising:
  a high precision reference frequency generating unit configured to generate a high precision reference frequency, the high precision reference frequency having higher precision than the precision of the first reference frequency; and
  a wireless communication unit configured to operate in a period based on the high precision reference frequency and to output an outgoing periodic signal to an external device,
  wherein the radio signal detection unit corrects the detection period by using the outgoing periodic signal outputted during a correction process from the wireless communication unit.

3. The communication device according to claim 1, wherein the radio signal detection unit performs intermittent operation including a predetermined time of an active period; and
  wherein the radio signal detection unit corrects the period of the detection window using a plurality of the time control signals generated for each active period.

4. The communication device according to claim 2, wherein the wireless communication unit comprises at least one wireless communication module comprising a wireless LAN communication module, a Bluetooth communication module, and a mobile communication module.

5. The communication device according to claim 2, wherein the wireless communication unit comprises a wireless LAN communication module; and
  wherein the radio signal detection unit corrects the detection period after the wireless LAN communication module checks whether or not to perform communication.

6. A detection period correction method in a communication device, the method comprising:
  generating a first reference frequency having a center frequency deviation under a predetermined condition;
  operating in a detection period based on the first reference frequency to detect an incoming periodic signal, wherein the incoming periodic signal is generated based on a second reference frequency having higher precision than a precision of the first reference frequency, and wherein the detection period is a period of a detection window for acquiring a detection result of the incoming periodic signal in a period corresponding to a period of the incoming periodic signal;
  generating a time control signal from a signal pattern comprising a high level and a low level in the detection window;
  performing an AND operation between an acquired time control signal and a past time control signal whose start time is shifted by a predetermined sampling pitch from a start time of the acquired time control signal;
  obtaining a shift amount having a maximum correlation; and
  correcting the detection period by increasing or decreasing the period of the detection window based on the shift amount.

7. The detection period correction method according to claim 6, further comprising:
  generating a high precision reference frequency, the high precision reference frequency having higher precision than the precision of the first reference frequency; and
  operating in a period based on the high precision reference frequency to output an outgoing periodic signal to an external device,
  wherein the detection period is corrected using the outgoing periodic signal outputted during a correction process from the wireless communication unit.

* * * * *